United States Patent [19]
Inaba

[11] Patent Number: 5,880,789
[45] Date of Patent: Mar. 9, 1999

[54] APPARATUS FOR DETECTING AND DISPLAYING SUPPLEMENTARY PROGRAM

[75] Inventor: Hitoshi Inaba, Fukaya, Japan

[73] Assignee: Kabushiki Kaisha Toshiba, Kawasaki, Japan

[21] Appl. No.: 718,164

[22] Filed: Sep. 19, 1996

[30] Foreign Application Priority Data

Sep. 22, 1995 [JP] Japan ................................. 7-244117

[51] Int. Cl.⁶ .................................................. H04N 5/445
[52] U.S. Cl. .......................... 348/564; 348/569; 348/468; 348/589
[58] Field of Search .................................... 348/563, 564, 348/569, 589, 600, 473, 468; H04N 5/445, 7/08

[56] References Cited

U.S. PATENT DOCUMENTS 5,109,279  4/1992  Ando ........................................ 348/468

FOREIGN PATENT DOCUMENTS

| 0 583 196 A1 | 2/1994 | European Pat. Off. . |
| 62-136184 | 6/1987 | Japan . |
| 1-125185 | 5/1989 | Japan . |
| 5-137125 | 6/1993 | Japan . |
| WO 94/17628 | 8/1994 | WIPO . |

OTHER PUBLICATIONS

Patent Abstracts of Japan, vol. 013, No. 371 (E–807) Aug. 1989 re JP–A–1–125,185.

Primary Examiner—Sherrie Hsia
Attorney, Agent, or Firm—Pillsbury Madison & Sutro LLP

[57] ABSTRACT

A teletext/data transmission decoder decodes information on characters and graphics and produces a supplementary program video signal. A proper program video signal arriving by way of a video processing circuit and a display image processing section and the supplementary program video signal coming from the decoder are synthetically combined by a synthesizing section and fed to a display unit. A system controller sets the decoder in a waiting state. If the proper program video signal contains data information, the system controller automatically starts a decoding operation and controls the synthesizing section to display the restored signal on the display unit. When an automatic display select switch is set to an automatic display mode, a supplementary program processing mode is automatically selected when a supplementary program is started.

11 Claims, 6 Drawing Sheets

APPARATUS FOR DETECTING AND DISPLAYING SUPPLEMENTARY PROGRAM

BACKGROUND OF THE INVENTION

1. Field of the Invention

This invention relates to an apparatus for detecting and displaying a supplementary program contained in a television program that is currently being transmitted and, more generally, it relates to a technology of detecting the status of reception of data transmission signals for characters and graphics contained in television signals for the sake of television viewers.

2. Description of the Related Art

The multiplexed text broadcasting, or teletext, is a currently available television broadcasting service for transmitting signals for characters and graphics along with ordinary television signals through a single transmission channel. It is used currently for programs of various categories including news, weather forecast, traffic information, tourism information and television shopping. In some programs, teletext is used for television polling.

The teletext is unilateral in the sense that information is offered only from the broadcasting station to the viewers. In the case of a telephone shopping program where the program provider transmits shopping information utilizing teletext, each viewer may take a memo of the code of each commodity he or she wants to buy, the telephone number of the mail-order firm and other pieces of information displayed on the screen and may subsequently dial the telephone number for ordering by referring to this memo. In the case of a program for television polling, viewers will also take a memo of the telephone numbers to be used for the poll and subsequently dial one of the telephone numbers by referring to the memo. In either case, however, there arises a problem that viewers can dial a wrong number because of a wrong dialing operation, whether because a wrong number has been memoed or for some other reason.

Thus, firstly, since the teletext is unilateral in the sense that information is offered only from the broadcasting station, the need to wait for calls from viewers create a long response time. Secondly, if the process entails telephone calls, it intrinsically involves wrong calls that will take place with a certain probability.

In order to bypass the above identified problems, there has been proposed a technique by which the broadcasting station transmits computer program data to each computer receiving set having the teletext feature. This technique comprises a means for executing a computer program by using the transmitted data so that the computer program executing means automatically dials the transmitted telephone number when the viewer keys in the command for such a call and also transmits other data keyed in by the viewer. With such an arrangement, the probability of dialing a wrong number is reduced to nil and the response time is significantly curtailed. In the following description, the program in which computer program data and supplementary data on characters and graphics explain the proper television program will be referred to as the supplementary program and the computer program will be referred to as script.

Since most of the existing circuit block (teletext transmission decoder) for receiving and processing teletext programs can be shared by the circuit block (data transmission decoder) for receiving and processing supplementary programs, the combination of a teletext transmission decoder and a data transmission decoder can be dimensionally reduced when they are designed in the form of a single circuit block that is operated selectively either in a teletext program mode or in a supplementary program mode.

When a circuit block adapted to both supplementary programs and teletext programs is operated in the supplementary program mode, it is of vital importance that the viewer can visually ascertain if the output of the circuit is being displayed or not in order to avoid a misguided action on the part of the viewer.

If the supplementary program is being transmitted simultaneously with the proper program, for example, and the viewer misunderstands that the supplementary program is not being transmitted, the viewer cannot respond correctly to the supplementary program by accessing it in a proper manner.

SUMMARY OF THE INVENTION

The viewer of a television receiving set comprising a teletext transmission decoder and a data transmission decoder cannot respond correctly to the supplementary program the set is receiving if he or she does not correctly understand the current status of reception. If the viewer does not correctly understand whether the supplementary program is being transmitted or not, he or she will not be sure if he or she can access the program or whether the program has started and would therefore become quite uncomfortable.

It is therefore an object of the present invention to provide an apparatus for detecting and displaying a supplementary program that automatically switches to the supplementary program mode whenever a supplementary program starts to be transmitted. It is another object of the present invention to provide an apparatus for detecting and displaying a supplementary program that makes the viewer clearly recognize that it has automatically switched to the supplementary program mode whenever a supplementary program starts to be transmitted in order to make the viewer feel comfortable.

According to the invention, the above objects are achieved by providing an apparatus for detecting and displaying a supplementary program comprising:

a receiving means for receiving a television signal;

a video processing means for processing the signal received by the receiving means and producing a video signal;

a decoding means for detecting data information contained in the video signal produced by the video processing means and decoding the data information to restore the supplementary program signal;

a synthesizing means for synthetically combining the proper program video signal produced by the video processing means and the supplementary program video signal produced by the decoding means into a display signal and producing it to a display unit; and a system control means for usually maintaining the decoding means in a standby state, initiating a decoding operation once data information is detected in the video signals and adding the restored signal to the display signal from the synthesizing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 2A and 2B are graphs illustrating a signaling system for transmitting teletext and data transmission signals to which this invention is applicable, where FIG. 2A illustrates even numbered fields of a television signal and FIG. 2B illustrates odd numbered fields;

DETAILED DESCRIPTION OF THE PREFERRED EMBODIMENTS

Now, the present invention will be described by referring to the accompanying drawings that illustrate preferred embodiments of the invention.

Figure 1:
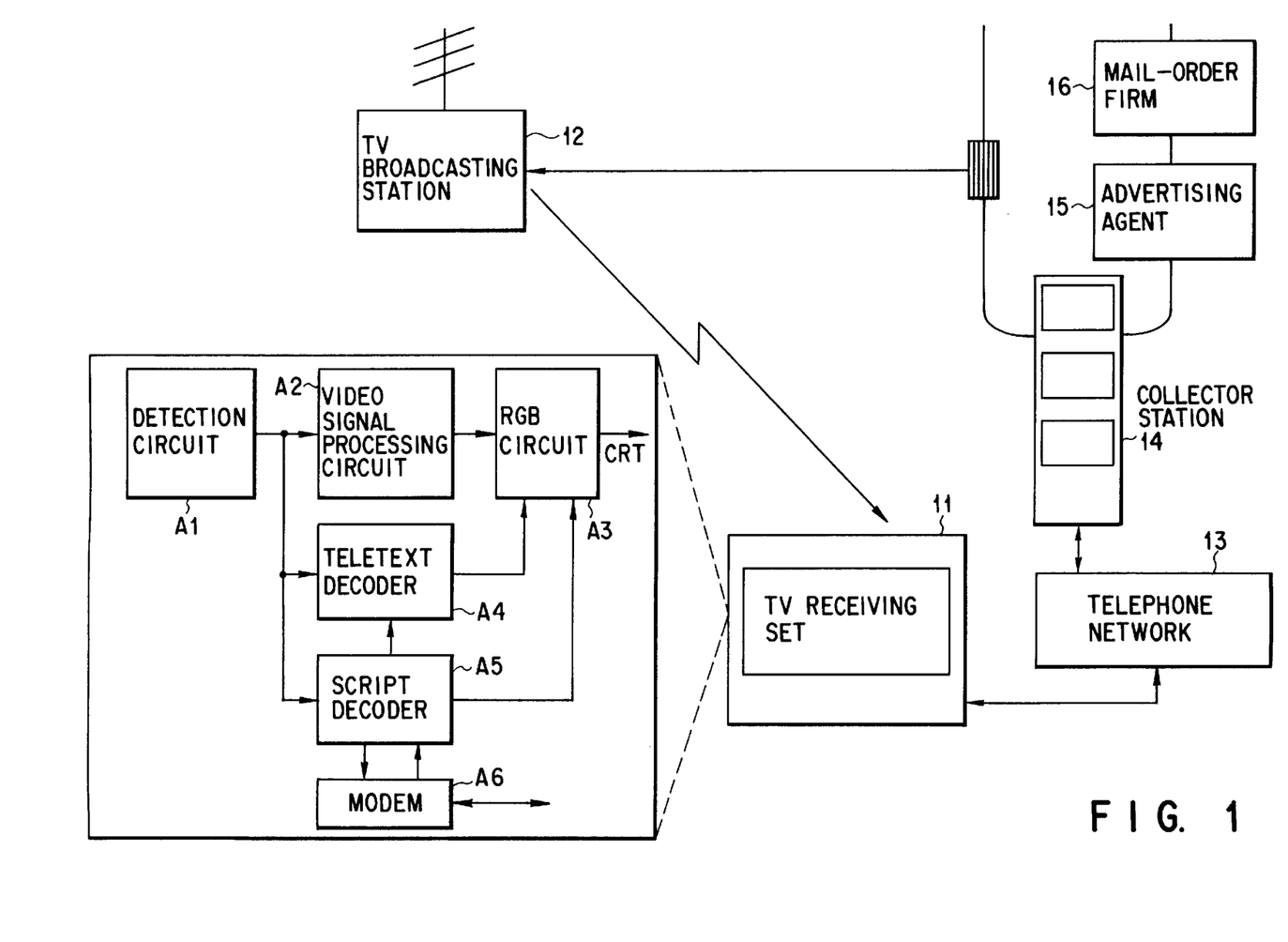
FIG. 1 is a block diagram of a transmission/reception system for teletext and data transmission signals realized by applying this invention.

FIG. 1 is a block diagram of a bidirectional telecommunications system realized by utilizing a television broadcasting network and applying this invention. This system utilizes the existing teletext service feature of a television broadcasting network and a telephone network. An expanded upload data transmission service is realized by combining a television broadcasting network that is unidirectional and a telephone network to bring forth a bidirectional service system. More specifically, this system is realized by expanding the existing teletext service feature of a television broadcasting network by means of software. Thus, the proper television broadcasting service and teletext services are not affected if a script is added to a TV program. Nor will the proper functions of a TV receiving set be affected by using an apparatus according to the invention with it.

The system of FIG. 1 is realized by establishing a network comprising a TV receiving set 11, a TV broadcasting station 12, a telephone network 13 and a collector station 14. The TV broadcasting station 12 transmits a script (i.e. a computer program) including a supplementary program with a proper television program to realize a bidirectional service for the proper television program. Alternatively, the TV broadcasting station 12 may transmit the computer program repeatedly as an independent program within a predetermined time slot. A script is a sort of application program that defines the procedure for establishing a bidirectional telecommunications system. It is transmitted in vertical blanking intervals of TV signals.

The script is stored in a memory of the TV receiving set 11 for receiving TV signals and typically is executed by a program executing device (or 'script decoder') incorporated into said TV receiving set 11. The script decoder then displays on the TV screen a symbol mark (e.g., the letter "i") indicating that the current program is accompanied by a supplementary program in order to notify the viewer about the supplementary program. The script decoder starts executing the script to display supplementary data for the program when the viewer keys in a command.

The means for displaying a symbol mark (i.e. a supplementary program mark) is unique to the system and will be described hereinafter along with its operation.

The viewer's response may be contained only within the TV receiving set 11 or in the alternative may be transmitted to the TV broadcasting station 12, advertising agent 15 or mail-order firm 16 by way of a local computer system (collector station 14) and the telephone network 13. The TV broadcasting station 12 can receive the responses from the viewers and reflect them on the current program on a real time basis. Alternatively, it may pick up desired data from the collector station 14 by way of the telephone network 13.

The TV receiving set 11 is provided with a script decoder A5 and a modem A6 for bidirectional telecommunications, in addition to an ordinary TV reception circuit including a detection circuit A1, a video signal processing circuit A2, an RGB circuit A3 and a teletext decoder A4. The script decoder A5 picks up scripts from the TV signals being transmitted from the TV broadcasting station 12 and executes them to realize bidirectional telecommunications.

The viewer operates the TV remote control to respond to the program and to send upload data. As the viewer keys in his or her response, the modem A6 contained in the TV receiving set 11 automatically dials the specified telephone number to connect itself to the collector station 14 by way of the telephone network 13 so that consequently the response of the viewer is conveyed to the collector station 14. The upload data (response data) are transmitted instantly if the program wants them on a real time basis. If not, they may be transmitted during the night when the lines are less busy.

The viewer does not have to dial him- or herself the specified telephone number because the modem A6 added to the TV receiving set 11 has an automatic dialing feature. The specified telephone number is contained in the script transmitted to the viewer from the TV broadcasting station 12 for each supplementary program. More than one telephone number may be contained in a script so that the viewer may select an appropriate number.

The script decoder A5 is a processor that executes a computer program at some time. However, since the teletext decoder A4 also contains a processor, the script decoder A5 may actually be realized by expanding the function of the teletext decoder A4 by way of software. In other words, the script decoder A5 is comprised of the teletext decoder A4 and a program ROM (not shown) and hence shares many circuits with the teletext decoder A4.

When the TV broadcasting station 12 transmits a program in which viewers can participate by telephone, it typically inserts a set of supplementary program data including a script into the TV signals that include the video and audio signals of the program. A program production system for producing a set of data for a supplementary program including a script and for inserting them into the proper program can be prepared by using a personal computer and a multiplexing device.

The TV broadcasting station 12 transmits a supplementary program that is added to the proper program by inserting it into the channel of the latter. The computer program to be added to the proper program may be produced by the TV broadcasting stations, by the advertising agent 15 of the program or by a third party such as a mail-order firm 16. The computer program produced by the TV broadcasting station may be prepared in advance or on a real time adhoc basis as in the case of broadcasting a live sports event.

A script typically has a configuration as described below.

A script is produced by the TV broadcasting station 12 and signals for it are transmitted with the ordinary video and audio signals. A script is realized as a set of objects as listed below.

(1) background/displaying materials (2) operational buttons (3) a sequence of characters (4) images Each of the objects may have a complementary procedure typically described by using an extended BASIC language, which includes control instructions for bidirectional telecommunications in addition to the ordinary BASIC language.

As a script is executed, firstly, the background of the scene and the elements that constitute the scene such as operational buttons are displayed. When the viewer selects one of the buttons and operates it, the program that corresponds to the button is started.

A processing procedure is registered in advance in the collector station 14 and the collected data may be distributed to the TV broadcasting station 12, the advertising agent 15, the program sponsor and the mail-order firm 16.

The following three types of bidirectional program can be realized by the above described bidirectional telecommunications system.

(1) supplementary data program capable of selecting and displaying additional information on the advertised commodities, selecting and displaying data for a live sports event, displaying a program summary, storing cooking recipes and displaying them later, responding to the answers to the questions posed on children in an educational program for children and responding to the answers from the viewers of a quiz show, (2) response feedback program (using a collector station 14) capable of carrying out a TV poll on social, economic and social issues, carrying out a TV poll on sports events and displaying statistics on correct answers and carrying out a tournament of viewers and (3) program having transactions (using a collector station 14) capable of receiving orders at a server (collector station 14) in a program for TV shopping, receiving requests for catalogs at a server (collector station 14) shown in TV ads and transmitting program viewing data for a survey on program viewing rates to a server (collector station 14) under the condition that the viewers consent to the survey.

Figure 2A:
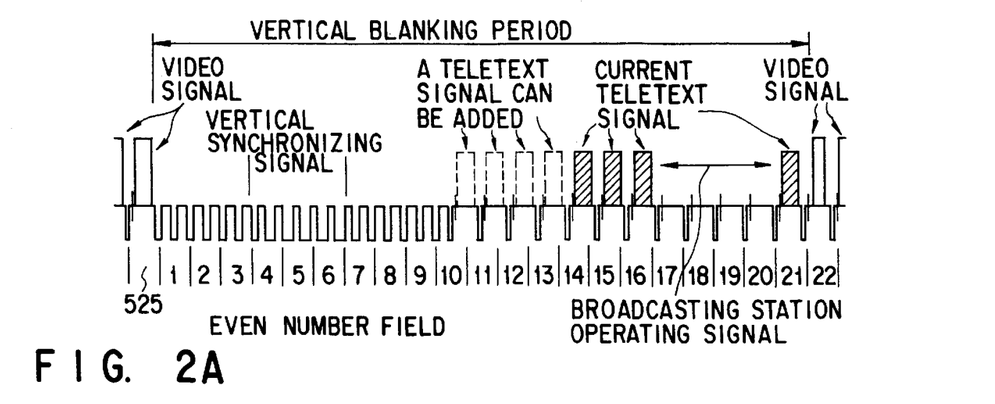
Figure 2B:
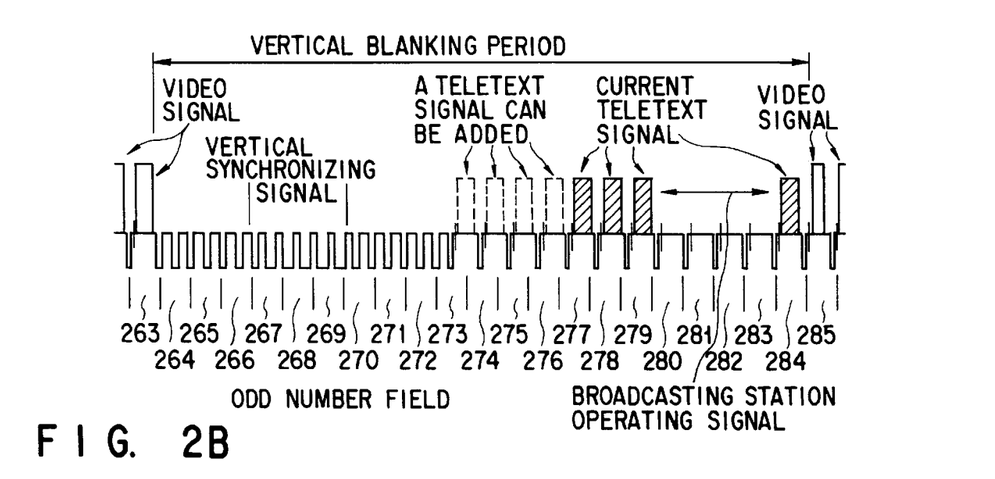

FIGS. 2A and 2B illustrates the hybrid signaling system for transmitting teletext data and character transmission data to which this invention is applicable. More specifically, character transmission data are transmitted in the 14th H (the 277th H) through 16th H (the 279th H) and the 21th H (the 284th H) of a vertical blanking interval. Since the vertical blanking interval still has a space for data multiplexing, the 10th H (the 273th H) through the 13th H (the 276H) may be used for multiplexing the signals for a script.

The signals for a script may be multiplexed at positions different from those of the signals for the current character multiplexing or at the positions of the signals for the current character multiplexing on a time division basis. Alternatively, the signals for character transmission data may be transmitted through one of the sub-channels for audio multiplexing. In the latter case, the TV receiving set 11 picks up data from an FM reception section (not shown).

Figure 3:
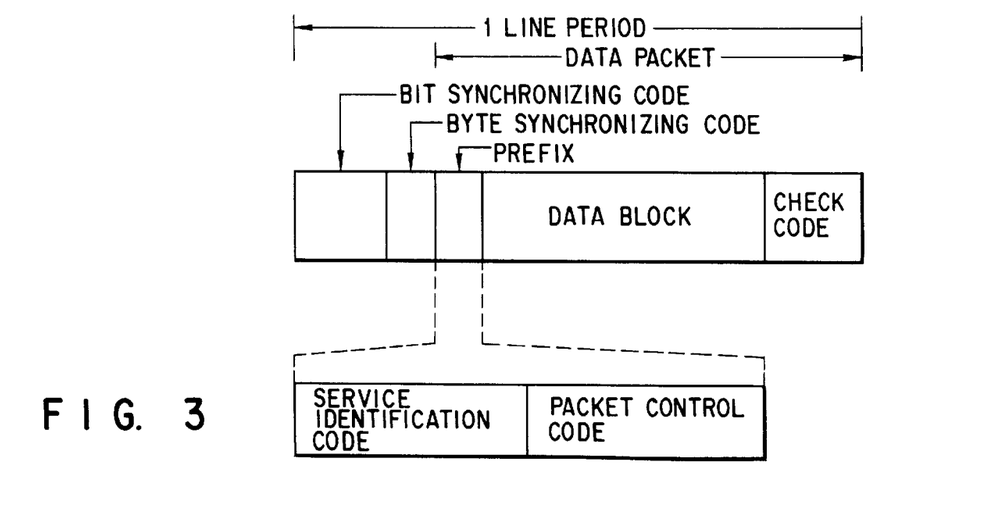
FIG. 3 is a schematic illustration of a data packet of teletext and data transmission signals to which this invention is applicable.

FIG. 3 schematically illustrates the configuration of a data packet of teletext and data transmission signals to which this invention is applicable and which are transmitted in a line period. A bit synchronizing code and a byte synchronizing code are arranged in front of the data packet. The data packet comprises a prefix, a data block and a check code. The prefix includes a service identification code and a packet control code. The service identification code is used to indicate that the signals for a supplementary program have arrived.

Figure 4:
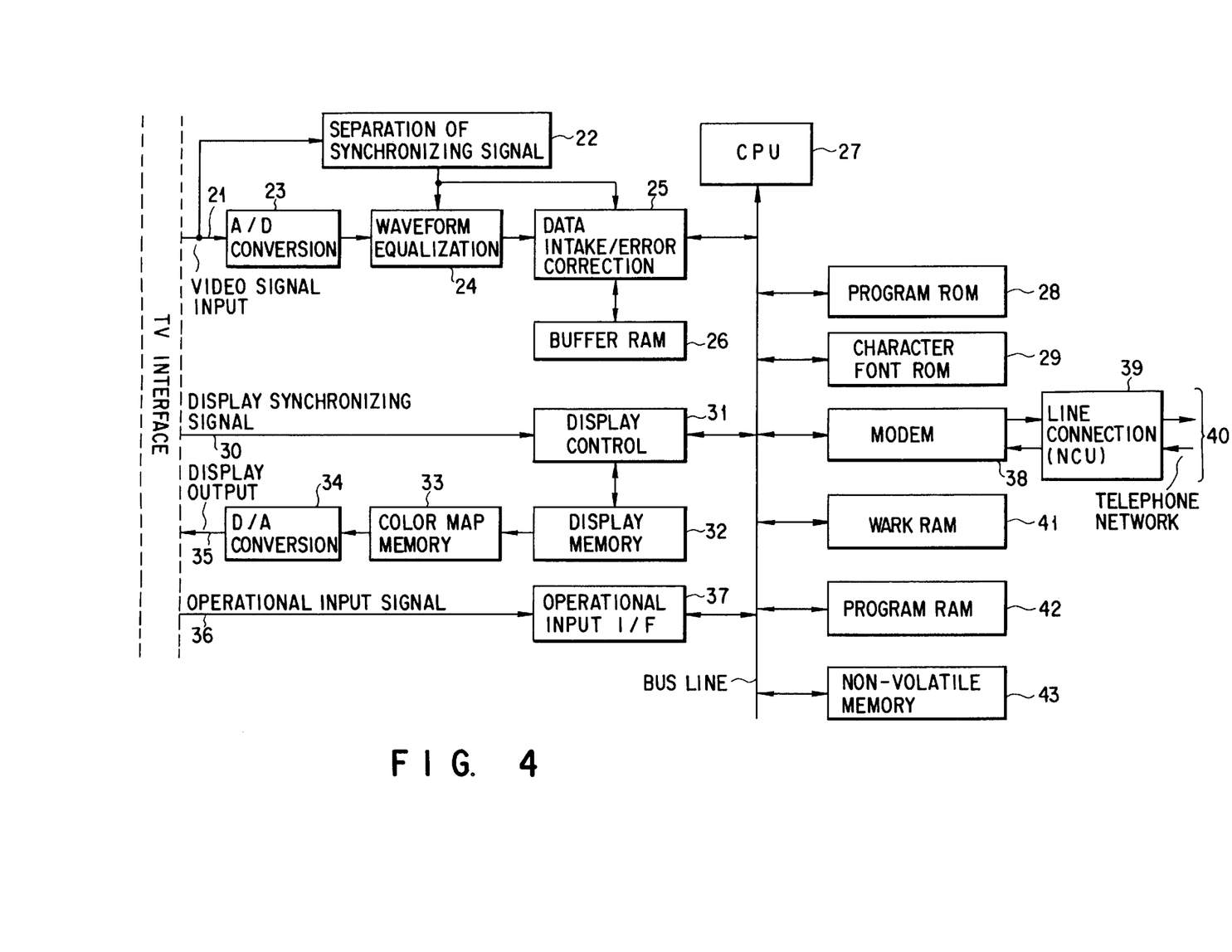
FIG. 4 is a block diagram of a teletext/data transmission decoder that can be used for an apparatus according to the invention.

FIG. 4 is a block diagram of a teletext/data transmission decoder that can be used for the TV receiving set 11 according to the invention. It includes a bidirectional transmission device, a teletext decoder and a script decoder.

Video signals of a selected transmission channel are fed to a synchronizing signal separating section 22 and an A/D converter 23 through an input terminal 21. A signal for data for bidirectional digital telecommunications is multiplexed on a video signal in vertical blanking intervals. The data digitized by the A/D converter 23 are processed for waveform equalization by a waveform equalizing section 24 and then fed to a data intake/error correcting section 25.

The waveform equalizing section 24 is designed to compensate for the degradation of the digitized video signal that takes place in the transmission channel and to separate the digital transmission signal multiplexed on the video signal. Then, it extracts the multiplexing data and the clock contained in the separated signal. The data intake/error correcting section 25 takes the multiplexing data into a buffer 26 in synchronism with the clock by a unit of 8 bits and corrects errors.

CPU 27 operates on the basis of the fixed program stored in a program ROM 28. Character font ROM 29 stores character fonts to be used for displaying characters so that the CPU 27 addresses the desired characters and reads out character data from the ROM 29 corresponding to the addressed characters.

Input terminal 30 is fed with a synchronizing signal for synchronizing the signal of the supplementary program with that of the proper program of the TV receiving set. The synchronizing signal is then fed to a display control section 31. The display control section 31 reads out the data stored in display memory 32 in synchronism with the image being displayed on the screen of the TV receiving set and carries out an operation of writing the data to be displayed in the display memory 32 according to a write instruction from the CPU 27.

The data read out of the display memory 32 are then fed to color map memory 33. The color map memory 33 receives the address of the data to be displayed and produces the data for the levels of the RGB color signal corresponding to the address. The level data are then converted into an analog RGB signal by D/A converter 34 and fed out through the output terminal 35 of the circuit as a display signal.

The display signal is then synthetically combined with a TV video signal by a synthesizing means (not shown). It is displayed on the display screen (not shown) as an image obtained by superimposing a graphic on the image of the proper program. Depending on the interface of the display apparatus, the D/A converter 34 may be omitted and the RGB signal produced by the color map memory 33 may be directly produced as an output signal.

Input terminal 36 receives the operation signal keyed in by the viewer by means of the TV remote control. The operation signal is then taken into and analyzed by the CPU 27 by way of an operational input interface (I/F) 37.

Modem 38 comprises a modulator and a demodulator, operates as a telecommunications control section, and is connected to a telephone network 40 by way of a line connecting section 39. The line connecting section 39 operates to connect the circuit to and disconnect it from the telephone network 40 under the control of the CPU 27.

The CPU 27 is connected to the functional blocks including the data intake/error correcting section 25, the program ROM 28, the character font ROM 29, the operation input I/F 37, the display control section 31 and the modem 38 by way of a bus line. The bus line is also connected to a work RAM 41, a program RAM 42, a non-volatile memory 43 and other devices.

The program RAM 42 is a memory for storing the script (computer program) transmitted from the TV broadcasting station, which can be executed according to the input operation of the viewer by interpreting the script by means of the interpreter of the fixed program stored in ROM 28.

The non-volatile memory 43 stores an identification number (ID) specific to the receiving terminal (decoder), which is typically used for transmitting order data to the collector station 14 for television shopping. The collector station 14 can identify the order by recognizing the ID.

The above described circuit is used for teletext programs. As the viewer specifies a teletext program by operating the TV remote control, the CPU 27 comes under the control of the program stored in the program ROM 28 for teletext programs. Then, the transmitted character data are converted into display data by the character font ROM 29 and stored in the display memory 32 by way of the display control section 31.

Figure 5:
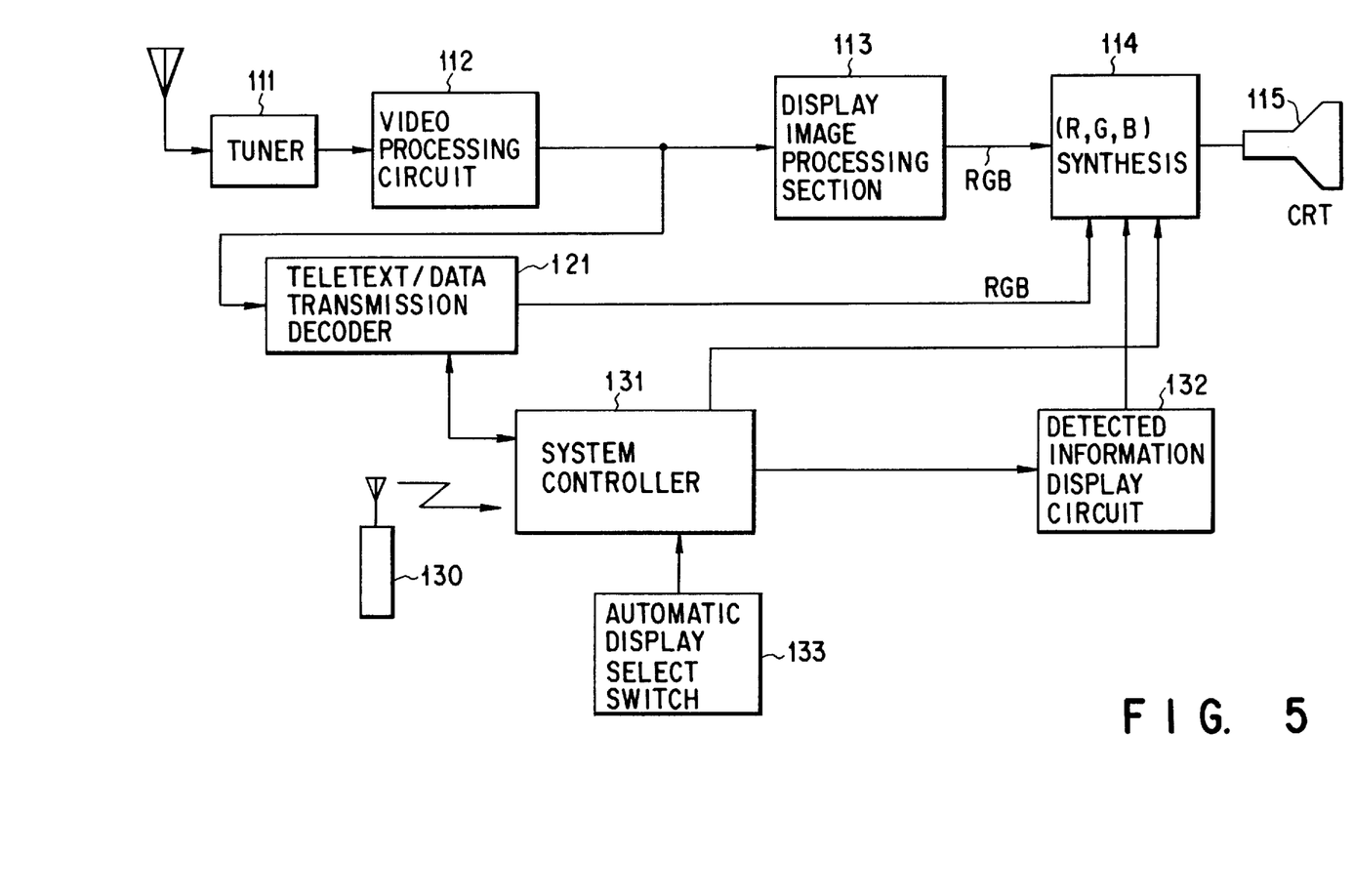
FIG. 5 is a block diagram of an embodiment of an apparatus for detecting and displaying a supplementary program according to the invention.

FIG. 5 is a block diagram of an embodiment of an apparatus for detecting and displaying a supplementary program according to the invention incorporated into a TV receiving set.

The TV signal received by tuner 111 is fed to video processing circuit 112 and processed for detection and gamma correction. The video signal produced by the video processing circuit 112 is, if necessary, processed for image compression or expansion by display image processing section 113. The RGB signal produced by the display image processing section 113 is fed to display unit 115, which may be a cathode ray tube, by way of synthesizing section 114.

The output signal of the video processing circuit 112 is fed to teletext/data transmission decoder 121, which detects the teletext signal and the signal for supplementary programs contained in a video signal produced by the video processing circuit 112 and has a configuration as described earlier by referring to FIG. 4.

When the system is operated in a character/graphic display mode, the restoration signal (RGB signal) produced by the teletext/data transmission decoder 121 is fed to the synthesizing section 114 and multiplexed on the video signal of the proper program.

The transmitted signals for teletext and data are automatically detected by the teletext/data transmission decoder 121, and the detected signals are fed to system controller 131.

When the transmission of signals for teletext and data are detected, the system controller 131 controls detected information display circuit 132 to cause the latter to generate a mark signal for displaying, for instance, an "i" mark on the screen so that the viewer can recognize the fact that a teletext program and a data program are currently being broadcast.

The system controller 131 is provided with an automatic display select switch 133, which is a switch for permitting an automatic shift into a supplementary program display mode for the teletext program and the data program that are currently being received. When the switch is turned on, the system controller 131 controls the detected information display circuit 132 to cause, for instance, a message "automatic display" to be superimposed on the image on the screen.

Figure 6:
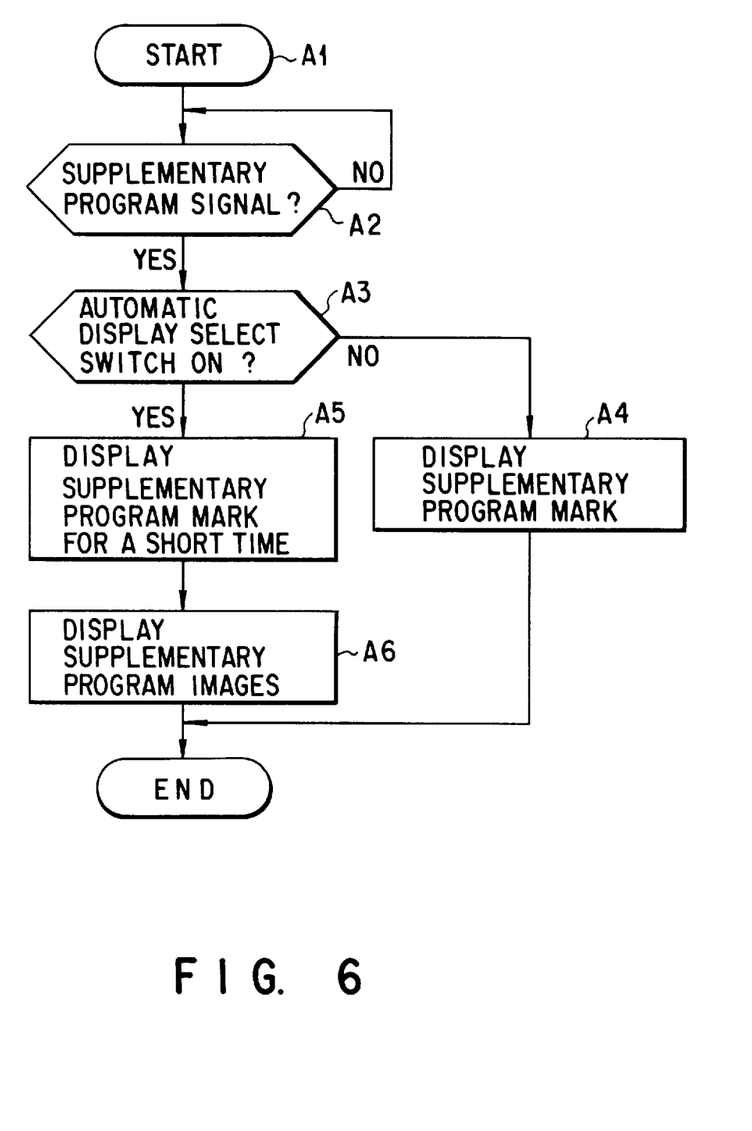
FIG. 6 is a flow chart illustrating the operation of the embodiment of FIG. 5.

FIG. 6 is a flow chart illustrating the operation of the system controller 131. When it recognizes that the TV signal currently being received contains a signal for a supplementary program (Steps A1 and A2), it determines whether the automatic display select switch 133 is on or off (Step A3). If it is off, then a supplementary program mark (e.g., "i" mark) is displayed. (Step A4) If, on the contrary, the automatic display select switch 133 is on, the supplementary program mark is displayed for a predetermined period of time (which is short and typically only several seconds) and the images of the supplementary program start to be displayed (Steps A5 and A6).

The on/off operation of the automatic display select switch 133 is controlled by way of the remote control 130. While the operation of the above steps is conducted under the control of the system controller 131 in the above description, it may alternatively be so arranged that the CPU 27 contained in the teletext/data transmission decoder 121 carries out Steps A2 through A6.

With a TV receiving set having a configuration as described above, the viewer can clearly recognize the start of a supplementary program whenever it is started. Particularly, if the automatic display select switch 133 is kept on, the TV receiving set automatically shifts into a supplementary program processing mode.

Thus, the viewer can instantly respond to the program by means of the remote control whenever appropriate. This arrangement may be particularly useful for viewer-participation quiz shows that move on a first come first served basis and other programs where several quick responders can get a prize.

Figure 7:
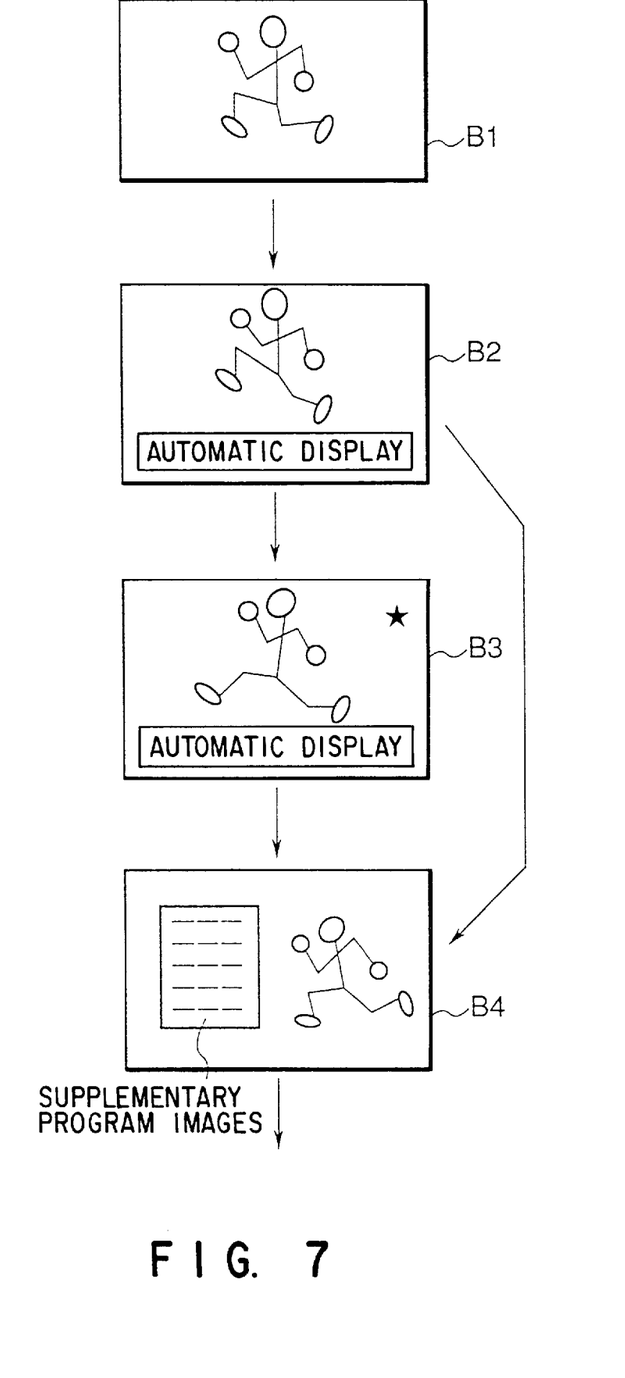
FIG. 7 illustrates views that can be displayed by an apparatus according to the invention.

FIG. 7 shows views that can be displayed by an apparatus according to the invention when the automatic display select switch 133 is kept on and a supplementary program is started so that the apparatus automatically shifts into a display mode.

Referring to FIG. 7, image B1 is viewed when the automatic display switch 133 is off. When the switch 133 is turned on, message "automatic display" is superimposed to produce image B2. When a supplementary program is actually received, a supplementary program mark (here, a star mark) is displayed for a short period of time, which may typically be 5 seconds, to display image B3. Thereafter, the supplementary program is displayed as in image B4. Under this condition, the supplementary program mark is erased because it can offend the viewer's eye.

Thus, as long as the automatic display select switch 133 is kept on, any supplementary program can be displayed without fail so that the viewer will not miss the timing for responding to the program whenever appropriate. With the above described displaying arrangement, since message "automatic display" is shown on the screen whenever a supplementary program is started, the viewer can feel confident if he or she is sensitive to such programs. The above arrangement may be so modified that image B2 is directly succeeded by image B4 when a supplementary program is started.

While the viewer is notified of the standby status of the teletext/data transmission decoder 121 by a message superimposed on the current image of the proper program in the above description, the message may be replaced by a sign or a graphic formed by the synthesizing section 114 and displayed on the display unit 115.

As described above in detail, according to the invention, there is provided an apparatus for detecting and displaying a supplementary program that is automatically switched to the supplementary program mode whenever a supplementary program starts to be transmitted so that the viewer is made to clearly recognize that it is automatically switched to the supplementary program mode whenever a supplementary program starts to be transmitted in order to make him or her feel comfortable.

Additional advantages and modifications will readily occur to those skilled in the art. Therefore, the invention in its broader aspects is not limited to the specific details, of representative devices shown and described herein. Accordingly, various modifications may be made without departing from the spirit or scope of the general inventive concept as defined by the appended claims and their equivalents.

What is claimed is:

1. An apparatus for detecting and displaying a supplementary program comprising:
    a receiving means for receiving a television signal;
    a video processing means for processing the signal received by said receiving means and producing a video signal;
    a decoding means for detecting data information contained in the video signal and decoding the data information to obtain a supplementary program signal;
    a synthesizing means for synthetically combining the video signal and the supplementary program signal into a display signal and producing the display signal to a display unit; and
    a system control means for usually maintaining said decoding means in a standby state, initiating a decoding operation once the data information is detected in said video signal, notifying on a screen that a supplementary program is available when said decoding means detects the data information, and adding the supplementary program signal to the display signal.

2. An apparatus for detecting and displaying according to claim 1, wherein said system control means is provided with a standby status display means for controlling said display unit so as to display a message or a sign indicating a standby status by way of said synthesizing means when the standby state is selected by said decoding means.

3. An apparatus for detecting and displaying according to claim 1, wherein said system control means controls said display unit so as to display a supplementary program mark for a predetermined period of time and subsequently, after erasing the supplementary program mark, the supplementary program signal by way of said synthesizing means when said decoding means detects that the video signal contains the data information.

4. An apparatus for detecting and displaying according to claim 1, wherein said system control means automatically initiates the decoding operation when the data information is detected.

5. An apparatus for detecting and displaying according to claim 1, wherein said system control means is provided with an automatic/manual display select means that automatically initiates the decoding operation in response to an external select action when the data information is detected.

6. An apparatus for detecting and displaying a supplementary program comprising:
    a receiving means for receiving a television signal;
    a video processing means for processing the signal received by said receiving means and producing a video signal;
    a decoding means for detecting data information contained in the video signal produced by said video processing means and decoding the data information to obtain a supplementary program signal;
    a synthesizing means for combining the video signal and the supplementary program signal into a display signal and producing the display signal to a display unit; and
    a system control means for usually maintaining said decoding means in a standby state, initiating a decoding operation and a viewer notification when said decoding means detects the data information, and enabling said synthesizing means.

7. An apparatus for detecting and displaying a supplementary program comprising:
    a receiving means for receiving a television signal;
    a video processing means for processing the signal received by said receiving means and producing a video signal;
    a decoding means for detecting data information contained in the video signal produced by said video processing means and decoding the data information to obtain a supplementary program signal;
    a synthesizing means for combining the video signal and the supplementary program signal into a display signal and producing the display signal to a display unit; and
    a system control means for initiating a decoding operation and a viewer notification when said decoding means detects the data information and enabling said synthesizing means.

8. An apparatus for detecting and displaying a supplementary program according to claim 6, wherein said system control means is provided with a standby status display means for initiating an indication to the viewer via said display unit when said decoding means is in the standby state.

9. An apparatus for detecting and displaying a supplementary program according to claim 6, wherein, when said decoding means detects the data information, said system control means initiates the display of a supplementary program mark for a predetermined period of time and subsequently enables said synthesizing means.

10. An apparatus for detecting and displaying a supplementary program according to claim 6, wherein said system control means automatically initiates the decoding operation when the data information is detected.

11. An apparatus for detecting and displaying a supplementary program according to claim 6, wherein said system control means is provided with an automatic/manual display select means that automatically initiates the decoding operation in response to an external select action when the data information is detected.

* * * * *